US008583155B2

(12) United States Patent
Swarts et al.

(10) Patent No.: US 8,583,155 B2
(45) Date of Patent: Nov. 12, 2013

(54) METHOD AND SYSTEM FOR FRAME TIMING ACQUISITION IN EVOLVED UNIVERSAL TERRESTRIAL RADIO ACCESS (EUTRA)

(75) Inventors: Francis Swarts, San Diego, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/460,144

(22) Filed: Apr. 30, 2012

(65) Prior Publication Data
US 2012/0275379 A1    Nov. 1, 2012

Related U.S. Application Data

(63) Continuation of application No. 12/251,796, filed on Oct. 15, 2008, now Pat. No. 8,170,592.

(60) Provisional application No. 61/096,430, filed on Sep. 12, 2008.

(51) Int. Cl.
*H04B 7/00* (2006.01)

(52) U.S. Cl.
USPC .......................................... 455/502; 370/350

(58) Field of Classification Search
USPC .......................................................... 455/502
See application file for complete search history.

(56) References Cited

U.S. PATENT DOCUMENTS

| 6,731,673 | B1* | 5/2004 | Kotov et al. ................. 375/145 |
| 7,599,327 | B2* | 10/2009 | Zhuang .......................... 370/329 |
| 7,738,437 | B2* | 6/2010 | Ma et al. ....................... 370/342 |
| 7,808,967 | B2 | 10/2010 | Han et al. |
| 7,899,481 | B2 | 3/2011 | McCoy et al. |
| 7,907,592 | B2 | 3/2011 | Han et al. |
| 7,920,598 | B2* | 4/2011 | Luo ............................... 370/509 |
| 7,924,808 | B2* | 4/2011 | Han et al. ..................... 370/350 |
| 7,969,964 | B2* | 6/2011 | Kim et al. ..................... 370/350 |
| 8,131,286 | B2* | 3/2012 | Diepstraten et al. ........ 455/426.1 |
| 8,170,592 | B2* | 5/2012 | Swarts et al. ................. 455/502 |
| 8,189,541 | B2* | 5/2012 | Swarts et al. ................. 370/336 |
| 8,311,031 | B2* | 11/2012 | Kim et al. ..................... 370/350 |
| 8,369,279 | B2* | 2/2013 | Swarts et al. ................. 370/330 |
| 8,369,280 | B2* | 2/2013 | Dinan ............................ 370/330 |
| 2004/0246998 | A1* | 12/2004 | Ma et al. ....................... 370/527 |
| 2007/0058595 | A1 | 3/2007 | Classon et al. |
| 2007/0064669 | A1 | 3/2007 | Classon et al. |

(Continued)

FOREIGN PATENT DOCUMENTS

WO    WO 2008/042874 A2    4/2008

*Primary Examiner* — Hai V Nguyen
(74) *Attorney, Agent, or Firm* — Sterne, Kessler, Goldstein & Fox PLLC

(57) ABSTRACT

Aspects of a method and system for frame timing acquisition in evolved universal terrestrial radio access (EUTRA) may include determining a received secondary synchronization sequence (SSS) based on a selected cyclic prefix length and on synchronization of a primary synchronization sequence (PSS). A first portion of information associated with the received SSS may be processed separately from a second portion of information associated with the received SSS. A frame timing and/or base station identifier may be determined by comparing the processed first portion of information with the processed second portion of information. The cyclic prefix length may be selected from a finite set of possible cyclic prefix lengths. The cyclic prefix length may be, for example, 9 samples or 32 samples. The primary synchronization sequence synchronization may be determined via correlation.

26 Claims, 7 Drawing Sheets

(56) References Cited

U.S. PATENT DOCUMENTS

| | | | |
|---|---|---|---|
| 2007/0202902 A1 | 8/2007 | Jansen et al. | |
| 2008/0080439 A1 | 4/2008 | Aziz et al. | |
| 2008/0095108 A1 | 4/2008 | Malladi et al. | |
| 2008/0205375 A1 | 8/2008 | Onggosanusi et al. | |
| 2008/0232300 A1 | 9/2008 | McCoy et al. | |
| 2008/0267137 A1 | 10/2008 | Dabak et al. | |
| 2008/0273522 A1* | 11/2008 | Luo et al. | 370/350 |
| 2008/0273582 A1 | 11/2008 | Gaal et al. | |
| 2008/0274753 A1 | 11/2008 | Attar et al. | |
| 2008/0291945 A1 | 11/2008 | Luo | |
| 2008/0305788 A1 | 12/2008 | Malladi et al. | |
| 2008/0317150 A1* | 12/2008 | Alexander et al. | 375/260 |
| 2009/0011761 A1* | 1/2009 | Han et al. | 455/434 |
| 2009/0046671 A1* | 2/2009 | Luo | 370/336 |
| 2009/0046672 A1* | 2/2009 | Malladi et al. | 370/336 |
| 2009/0046702 A1* | 2/2009 | Luo et al. | 370/350 |
| 2009/0086713 A1 | 4/2009 | Luo | |
| 2009/0116473 A1 | 5/2009 | Lindoff et al. | |
| 2009/0117896 A1 | 5/2009 | Baldemair et al. | |
| 2009/0122839 A1 | 5/2009 | Luo et al. | |
| 2009/0125363 A1 | 5/2009 | Frederiksen et al. | |
| 2009/0129298 A1 | 5/2009 | Luo et al. | |
| 2009/0131037 A1* | 5/2009 | Malladi et al. | 455/422.1 |
| 2009/0135803 A1 | 5/2009 | Luo et al. | |
| 2009/0135804 A1 | 5/2009 | Swarts et al. | |
| 2009/0136034 A1 | 5/2009 | Gaal et al. | |
| 2009/0161655 A1 | 6/2009 | Uppala | |
| 2009/0180435 A1 | 7/2009 | Sarkar | |
| 2009/0202016 A1 | 8/2009 | Seong et al. | |
| 2009/0207853 A1 | 8/2009 | Mueller-Weinfurtner et al. | |
| 2009/0247172 A1 | 10/2009 | Palanki et al. | |
| 2009/0252075 A1 | 10/2009 | Ji et al. | |
| 2009/0310782 A1 | 12/2009 | Dabak et al. | |
| 2009/0325626 A1 | 12/2009 | Palanki et al. | |
| 2010/0008282 A1 | 1/2010 | Bhattad et al. | |
| 2010/0008317 A1 | 1/2010 | Bhattad et al. | |
| 2010/0035611 A1 | 2/2010 | Montojo et al. | |
| 2010/0046402 A1* | 2/2010 | Forck et al. | 370/280 |
| 2010/0069066 A1* | 3/2010 | Shen et al. | 455/434 |
| 2010/0069106 A1* | 3/2010 | Swarts et al. | 455/502 |
| 2010/0074369 A1 | 3/2010 | Seki | |
| 2010/0091702 A1 | 4/2010 | Luo et al. | |
| 2010/0099409 A1 | 4/2010 | Han et al. | |
| 2010/0103906 A1 | 4/2010 | Montojo et al. | |
| 2010/0110873 A1* | 5/2010 | Han et al. | 370/208 |
| 2010/0135257 A1 | 6/2010 | Higuchi et al. | |
| 2010/0182979 A1 | 7/2010 | Malladi et al. | |
| 2010/0226334 A1* | 9/2010 | Ma et al. | 370/329 |
| 2010/0279707 A1* | 11/2010 | Fischer et al. | 455/456.1 |
| 2010/0296429 A1* | 11/2010 | Han et al. | 370/312 |
| 2011/0002430 A1* | 1/2011 | Kim et al. | 375/362 |
| 2011/0007657 A1 | 1/2011 | Kazmi et al. | |
| 2011/0007718 A1* | 1/2011 | Swarts et al. | 370/336 |
| 2011/0009138 A1 | 1/2011 | Kim et al. | |
| 2011/0026413 A1* | 2/2011 | Swarts et al. | 370/252 |
| 2011/0044159 A1 | 2/2011 | Kishiyama et al. | |
| 2011/0044199 A1 | 2/2011 | Kazmi et al. | |
| 2011/0075748 A1* | 3/2011 | Novak et al. | 375/260 |
| 2011/0103506 A1 | 5/2011 | Moon et al. | |
| 2011/0103534 A1* | 5/2011 | Axmon et al. | 375/371 |
| 2011/0201334 A1* | 8/2011 | Rosenqvist et al. | 455/436 |
| 2011/0223901 A1* | 9/2011 | Swarts et al. | 455/422.1 |
| 2011/0243104 A1* | 10/2011 | Swarts et al. | 370/336 |
| 2011/0305237 A1* | 12/2011 | Luo et al. | 370/350 |
| 2012/0046056 A1* | 2/2012 | Luo et al. | 455/502 |
| 2012/0093076 A1 | 4/2012 | Zhang et al. | 370/328 |
| 2012/0093267 A1 | 4/2012 | Zhou et al. | 375/343 |
| 2012/0122446 A1 | 5/2012 | Malladi et al. | 455/422.1 |
| 2012/0170520 A1 | 7/2012 | Han et al. | 370/328 |
| 2012/0275379 A1* | 11/2012 | Swarts et al. | 370/328 |
| 2012/0281792 A1* | 11/2012 | Swarts et al. | 375/343 |
| 2012/0307726 A1* | 12/2012 | Pi et al. | 370/328 |
| 2013/0003672 A1* | 1/2013 | Dinan | 370/329 |
| 2013/0003673 A1* | 1/2013 | Dinan | 370/329 |
| 2013/0010715 A1* | 1/2013 | Dinan | 370/329 |

* cited by examiner

METHOD AND SYSTEM FOR FRAME TIMING ACQUISITION IN EVOLVED UNIVERSAL TERRESTRIAL RADIO ACCESS (EUTRA)

CROSS-REFERENCE TO RELATED APPLICATIONS/INCORPORATION BY REFERENCE

This application is a continuation of U.S. application Ser. No. 12/251,796, filed on Oct. 15, 2008, issued as U.S. Pat. No. 8,170,592 on May 1, 2012, which claims the benefit of U.S. Provisional Application Ser. No. 61/096,430, filed on Sep. 12, 2008. U.S. application Ser. No. 12/251,796, filed on Oct. 15, 2008, is incorporated herein by reference in its entirety.

FIELD OF THE INVENTION

Certain embodiments of the invention relate to signal processing for communication systems. More specifically, certain embodiments of the invention relate to a method and system for frame timing acquisition in evolved universal terrestrial radio access (EUTRA).

BACKGROUND OF THE INVENTION

Mobile communication has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third (3G) and fourth generation (4G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase throughput and, in turn, offer advanced QoS capabilities and speeds that rival those delivered by cable modem and/or DSL service providers. Recently, advances in multiple antenna technology and other physical layer technologies have started to significantly increase available communication data rates.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for frame timing acquisition in evolved universal terrestrial radio access (EUTRA), substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for frame timing acquisition in evolved universal terrestrial radio access (EUTRA). Aspects of the method and system for frame timing acquisition in EUTRA may comprise determining a received secondary synchronization sequence (SSS) based on an selected cyclic prefix length, and synchronization of a primary synchronization sequence (PSS). A first portion of information associated with the received SSS may be processed separately from a second portion of information associated with the received SSS. A frame timing and/or base station identifier may be determined, by comparing the processed first portion of information with the processed second portion of information.

The cyclic prefix length may be selected from a finite set of possible cyclic prefix lengths, where the finite set of possible cyclic prefix lengths comprises 9 samples and 32 samples, for example. The primary synchronization sequence synchronization may be determined via correlation. Alternatively, the primary synchronization sequence synchronization may be determined by determining a slot timing and a channel estimate via PSS processing. At least a part of the first portion of information may be associated with odd sub-carrier positions, and may be processed separately from at least a part of the first portion of information that may be associated with even sub-carrier positions. At least a part of the second portion of information may be associated with odd sub-carrier positions, and may be processed separately from at least a part of the second portion of information that may be associated with even sub-carrier positions. Odd sub-carrier positions and even sub-carrier positions associated with the secondary synchronization sequence may be scrambled once and twice respectively, or vice versa. The frame timing may be determined by determining whether the selected cyclic prefix length results in consistently decoded information, where the consistency of the decoded information may be determined by comparing the processed first portion of information with the processed second portion of information. The first portion of information may be a first half-frame, and the second portion of information may be a second half-frame.

Figure 1A:
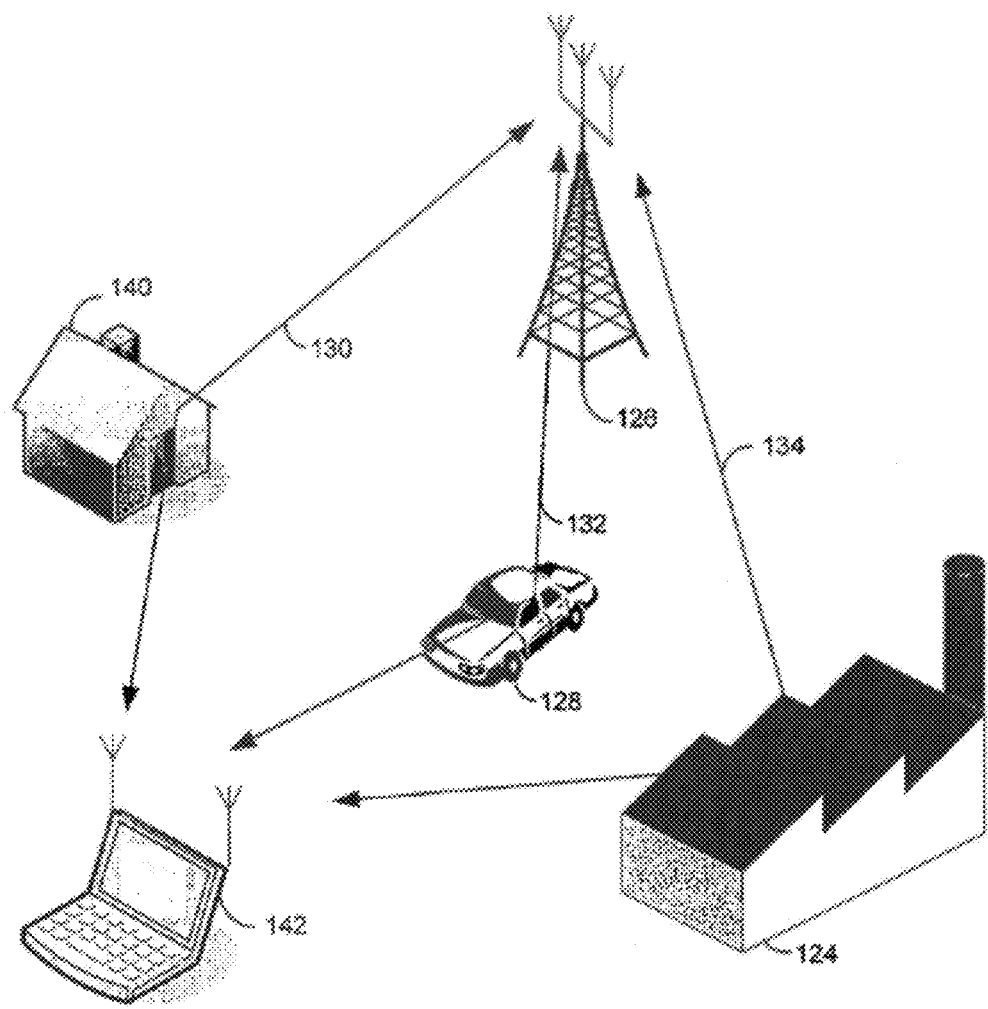
FIG. 1A is a diagram illustrating exemplary cellular multipath communication between a base station and a mobile computing terminal, in connection with an embodiment of the invention.

FIG. 1A is a diagram illustrating exemplary cellular multipath communication between a base station and a mobile computing terminal, in connection with an embodiment of the invention. Referring to FIG. 1A, there is shown a building 140 such as a home or office, a mobile terminal 142, a factory 124, a base station 126, a car 128, and communication paths 130, 132 and 134.

The base station 126 and the mobile terminal 142 may comprise suitable logic, circuitry and/or code that may be enabled to generate and process MIMO communication signals.

Wireless communications between the base station 126 and the mobile terminal 142 may take place over a wireless channel. The wireless channel may comprise a plurality of communication paths, for example, the communication paths 130, 132 and 134. The wireless channel may change dynamically as the mobile terminal 142 and/or the car 128 moves. In some cases, the mobile terminal 142 may be in line-of-sight (LOS) of the base station 126. In other instances, there may not be a direct line-of-sight between the mobile terminal 142 and the base station 126 and the radio signals may travel as reflected communication paths between the communicating entities, as illustrated by the exemplary communication paths 130, 132 and 134. The radio signals may be reflected by man-made structures like the building 140, the factory 124 or the car 128, or by natural obstacles like hills. Such a system may be referred to as a non-line-of-sight (NLOS) communications system.

Signals communicated by the communication system may comprise both LOS and NLOS signal components. If a LOS signal component is present, it may be much stronger than NLOS signal components. In some communication systems, the NLOS signal components may create interference and reduce the receiver performance. This may be referred to as multipath interference. The communication paths 130, 132 and 134, for example, may arrive with different delays at the mobile terminal 142. The communication paths 130, 132 and 134 may also be differently attenuated. In the downlink, for example, the received signal at the mobile terminal 142 may be the sum of differently attenuated communication paths 130, 132 and/or 134 that may not be synchronized and that may dynamically change. Such a channel may be referred to as a fading multipath channel. A fading multipath channel may introduce interference but it may also introduce diversity and degrees of freedom into the wireless channel. Communication systems with multiple antennas at the base station and/or at the mobile terminal, for example MIMO systems, may be particularly suited to exploit the characteristics of wireless channels and may extract large performance gains from a fading multipath channel that may result in significantly increased performance with respect to a communication system with a single antenna at the base station 126 and at the mobile terminal 142, in particular for NLOS communication systems. Furthermore, Orthogonal Frequency Division Multiplexing (OFDM) systems may be suitable for wireless systems with multipath. To enable a communication receiver to decode data, and to deal with multipath propagation, for example via interference cancellation protocols, timing may be established with respect to the received signal, in particular frame timing, and slot timing.

Figure 1B:
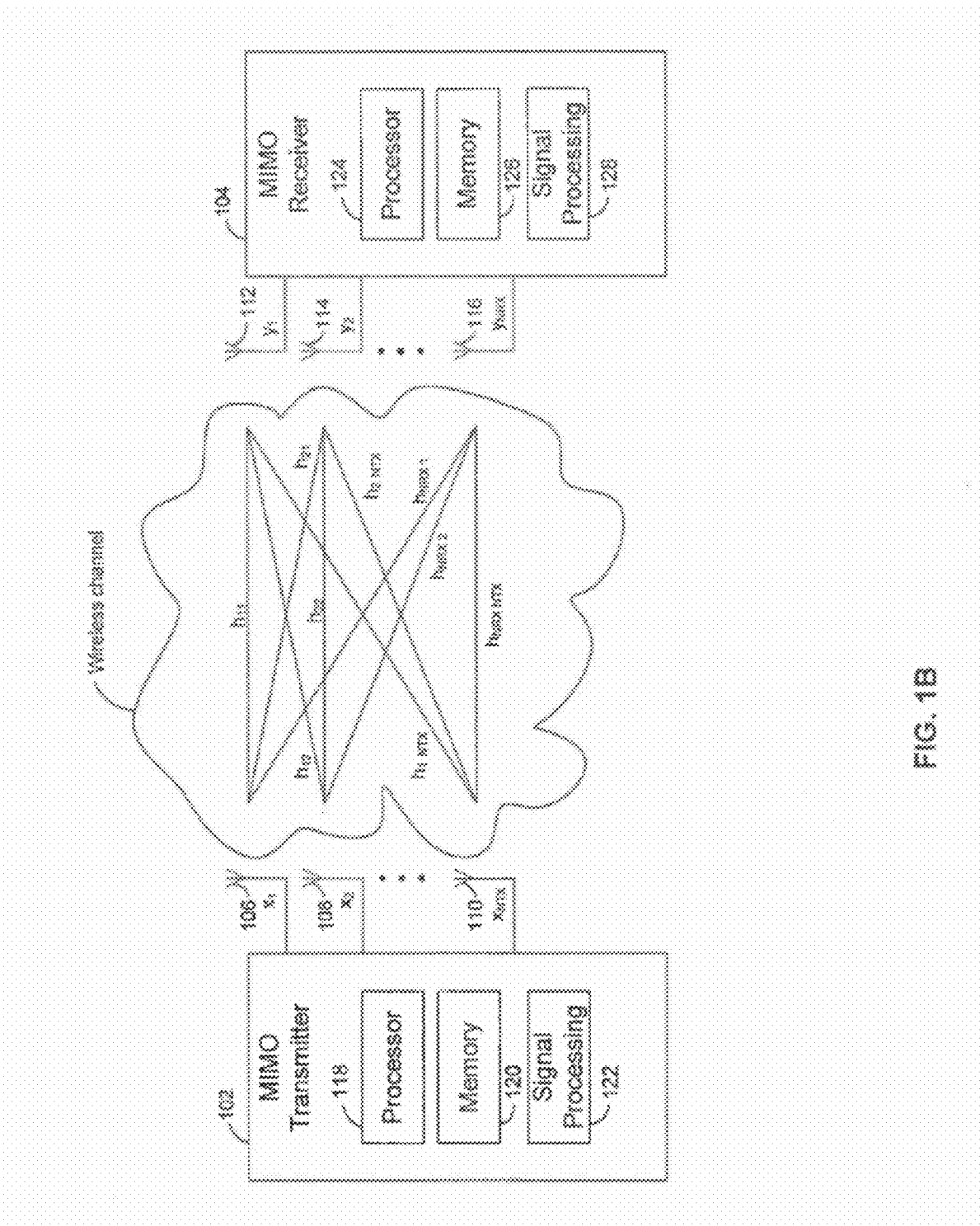
FIG. 1B is a diagram illustrating an exemplary MIMO communication system, in accordance with an embodiment of the invention.

FIG. 1B is a diagram illustrating an exemplary MIMO communication system, in accordance with an embodiment of the invention. Referring to FIG. 1B, there is shown a MIMO transmitter 102 and a MIMO receiver 104, and antennas 106, 108, 110, 112, 114 and 116. The MIMO transmitter 102 may comprise a processor module 118, a memory module 120, and a signal processing module 122. The MIMO receiver 104 may comprise a processor module 124, a memory module 126, and a signal processing module 128. There is also shown a wireless channel comprising communication paths $h_{11}$, $h_{12}$, $h_{22}$, $h_{21}$, $h_{2\,NTX}$, $h_{1\,NTX}$, $h_{NRX\,1}$, $h_{NRX\,2}$, $h_{NRX\,NTX}$, where $h_{mn}$ may represent a channel coefficient from transmit antenna n to receiver antenna m. There may be $N_{TX}$ transmitter antennas and $N_{RX}$ receiver antennas. There is also shown transmit symbols $x_1$, $x_2$ and $x_{NTX}$, and receive symbols $y_1$, $y_2$ and $y_{NRX}$.

The MIMO transmitter 102 may comprise suitable logic, circuitry and/or code that may be enabled to generate transmit symbols $x_i$ $i \in \{1, 2, \ldots N_{TX}\}$ that may be transmitted by the transmit antennas, of which the antennas 106, 108 and 110 may be depicted in FIG. 1B. The processor module 118 may comprise suitable logic, circuitry, and/or code that may be enabled to process signals. The memory module 120 may comprise suitable logic, circuitry, and/or code that may be enabled to store and/or retrieve information for processing in the MIMO transmitter 102. The signal processing module 122 may comprise suitable logic, circuitry and/or code that may be enabled to process signals, for example in accordance with one or more MIMO transmission protocols. The MIMO receiver 104 may comprise suitable logic, circuitry and/or code that may be enabled to process the receive symbols $y_i$ $i \in \{1, 2, \ldots N_{RX}\}$ that may be received by the receive antennas, of which the antennas 112, 114 and 116 may be shown in FIG. 1B. The processor module 124 may comprise suitable logic, circuitry, and/or code that may be enabled to process signals. The memory module 126 may comprise suitable logic, circuitry, and/or code that may be enabled to store and/or retrieve information for processing in the MIMO receiver 104. The signal processing module 128 may comprise suitable logic, circuitry and/or code that may be enabled to process signals, for example in accordance with one or more MIMO protocols. An input-output relationship between the transmitted and the received signal in a MIMO system may be specified as:

$$y = Hx + n$$

where $y = [y_1, y_2, \ldots y_{NRX}]^T$ may be a column vector with $N_{RX}$ elements, $.^T$ may denote a vector transpose, $H = [h_{ij}]$: $i \in \{1, 2, \ldots N_{RX}\}$; $j \in \{1, 2, \ldots N_{TX}\}$ may be a channel matrix of dimensions $N_{RX}$ by $N_{TX}$, $x = [x_1, x_2, \ldots x_{NTX}]^T$ is a column vector with $N_{TX}$ elements and n is a column vector of noise samples with $N_{RX}$ elements.

The system diagram in FIG. 1B may illustrate an exemplary multi-antenna system as it may be utilized in a Universal Mobile Telecommunication System (UMTS) Evolved Universal Terrestrial Radio Access (EUTRA) or Long-Term Evolution (LTE) system. Over each of the $N_{TX}$ transmit antennas, a symbol stream, for example $x_1(t)$ over antenna 106, may be transmitted. A symbol stream, for example $x_1(t)$, may comprise one or more symbols, wherein each symbol may be modulated onto a different sub-carrier. OFDM systems may generally use a relatively large number of subcarriers in parallel, for each symbol stream. For example, a symbol stream $x_1(t)$ may comprise symbols on carriers $f_m$:$m \in \{1, 2, \ldots M\}$, and M may be a subset of the FFT size that may be utilized at the receiver. For instance, with FFT sizes of N, N>M and may create guard-tones that may allow utilization of variable bandwidth when deployed, for example, 64, 128, or 512 sub-carriers. The M sub-carriers may comprise a symbol stream $x_1(t)$, for example, that may occupy a bandwidth of a few kilohertz to a few megahertz.

Common bandwidth may be between 1 MHz and up to 100 MHz, for example. Thus, each symbol stream may comprise one or more sub-carriers, and for each sub-carrier a wireless channel may comprise multiple transmission paths. For example, a wireless channel $h_{12}$ from transmit antenna 108 to receive antenna 112, as illustrated in the figure, may be multi-dimensional. In particular, the wireless channel $h_{12}$ may comprise a temporal impulse response, comprising one or more multipath components. The wireless channel $h_{12}$ may also comprise a different temporal impulse response for each sub-carrier $f_m$ of the symbol stream, for example $x_2(t)$. The wireless channels as illustrated in FIG. 1B depicts a spatial dimension of the wireless channel because the transmitted signal from each transmit antenna may be received differently at each receiver antenna. Thus, a channel impulse response may be measured and/or estimated for each sub-carrier.

To enable decoding of data, and channel estimation, frame timing may be acquired in accordance with various embodiments of the invention. The transmission of small transmission entities, for example bits, may be arranged into larger units consisting of several consecutive bits, and/or symbols. These larger units may be slots, and multiple consecutive slots may be referred to as a frame. To enable data reception, both slot and frame timing may be determined at the receiver.

Figure 2:
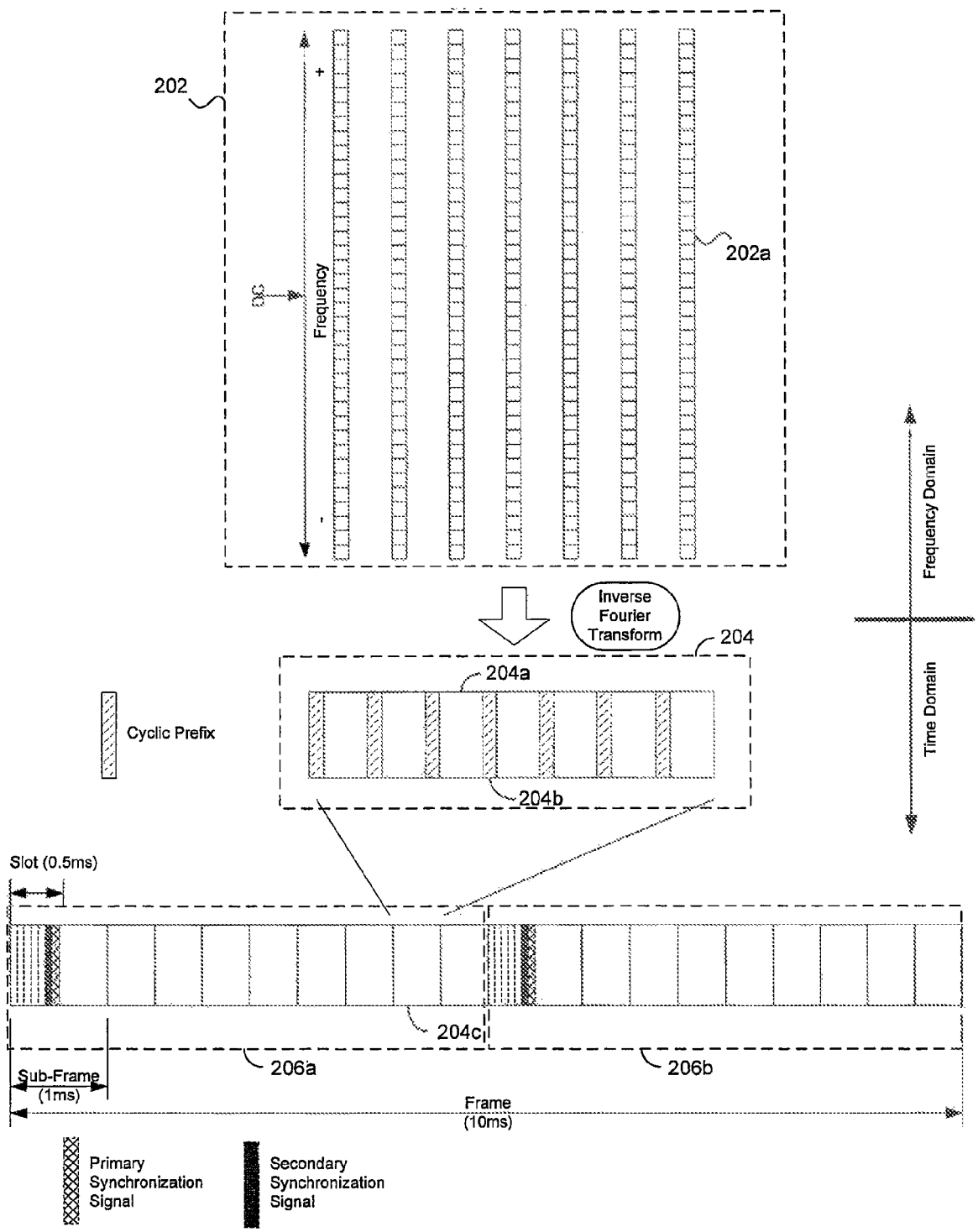
FIG. 2 is a diagram illustrating an exemplary OFDM frame structure, in accordance with various embodiments of the invention.

FIG. 2 is a diagram illustrating an exemplary OFDM frame structure, in accordance with various embodiments of the invention. Referring to FIG. 2, there is shown a frequency domain signal 202 comprising a sub-carrier 202a, a slot 204, a slot 204c, and half-frames 206a and 206b. The slot 204 may comprise an OFDM symbol 204a, and a cyclic prefix 204b.

In accordance with various embodiments of the invention, FIG. 2 may illustrate an exemplary OFDM symbol structure similar to EUTRA (LTE). To generate a time domain signal for transmission, a bit/symbol stream may be mapped onto a modulation constellation, for example QPSK, 16 PSK, and/or 64 QAM. The modulated symbols may be mapped to discrete frequency sub-carriers in the frequency domain to generate a frequency domain signal 202. The frequency domain signal 202 may comprise a plurality of sub-carriers, for example an exemplary sub-carrier 202a. A time domain signal, for example slot 204, may be obtained by performing an Inverse Fourier Transform (IFT). The modulated symbols mapped to the sub-carriers of frequency domain signal 202 may be complex, in some instances. A set of sub-carriers over a desirable frequency range that may be transformed to a time domain signal may be referred to as an OFDM symbol in the slot 204. There is shown an exemplary OFDM symbol 204a in the time domain.

In order to mitigate inter-symbol interference due to frequency-dispersive channels, a guard period may be inserted between consecutive OFDM symbols. These guard periods may be referred to as cyclic prefixes, and may be illustrated in slot 204 by a hatch pattern, for example cyclic prefix 204b. The cyclic prefixes, for example cyclic prefix 204b, may comprise a number of trailing bits from time domain OFDM symbol, for example. In accordance with an embodiment of the invention, a plurality of slots 204 of duration 0.5 ms may be arranged into sub-frames comprising 2 slots (1 ms), half-frames comprising 10 slots, and frames, comprising 20 slots (10 ms). FIG. 2 may illustrate a frame comprising two half-frames 206a and 206b.

To enable synchronization, known synchronization sequences may be inserted into a transmitted signal at the base station, for example base station 126. In some instances, these synchronization sequences are inserted at regular intervals. In accordance with an embodiment of the invention, the first slot of half-frames 206a and 206b may comprise synchronization signals. The synchronization signals may comprise, for example, a primary synchronization signal (PSS), and a secondary synchronization signal (SSS), as illustrated in FIG. 2. The PSS may comprise one of a set of three sequences, for example. The SSS may comprise two interleaved sequences, each selected from a set of 31 sequences, for example. Both the PSS and the SSS may, in accordance with an embodiment of the invention, be of length 62 bits. For synchronization between a transmitter and a receiver, it may be desirable for the receiver to establish slot and frame boundaries.

Figure 3:
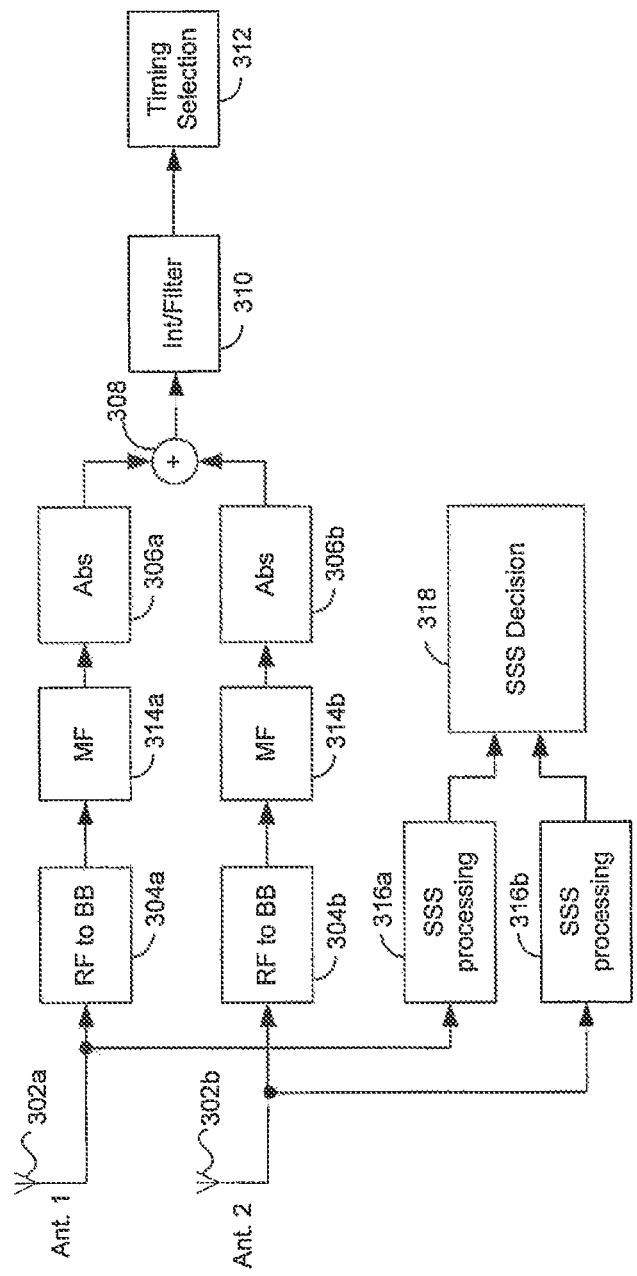
FIG. 3 is a diagram of an exemplary PSS correlation system, in accordance with an embodiment of the invention.

FIG. 3 is a diagram of an exemplary PSS correlation system, in accordance with an embodiment of the invention. Referring to FIG. 3, there is shown antennas 302a and 302b, RF processing chains 304a and 304b, magnitude modules 306a and 306b, an adder 308, a filter 310, a timing selection module 312, matched filters 314a and 314b, Secondary Synchronization Sequence (SSS) processing modules 316a and 316b, and an SSS decision module 318.

The antenna 302a may comprise suitable logic, circuitry and/or code that is enabled to receive a radio-frequency electromagnetic signal and convert it to an electrical signal. The antenna 302 may be substantially similar to antenna 302b. The RE processing chains 304a and 304b may comprise suitable logic, circuitry and/or code that is enabled to convert a radio-frequency signal to a baseband signal. The magnitude modules 306a and 306b may comprise suitable logic, circuitry and/or code that is enabled to generate an output signal that may be related to the magnitude of an input signal. The adder 308 may comprise suitable logic, circuitry and/or code that is enabled to form an output signal proportional to a (weighted) sum of a plurality of input signals.

The filter 310 may comprise suitable logic, circuitry and/or code that is enabled to generate an output signal that is a filtered version of its input signal. The filter 310 may also (or alternatively) be enabled to operate as an integrator. In this regard, the filter 310 may integrate a received input signal and accordingly generate an output signal that is an integrated version of the received input signal. Accordingly, filter 310 provides an output that is a filtered and/or integrated version of its input signal.

The timing selection module 312 may comprise suitable logic, circuitry and/or code that is enabled to store a plurality of input values, and select one or more of these values based on one or more selection functions. The SSS processing module 316a may comprise suitable logic, circuitry and/or code that is enabled to perform processing to enable the detection of the SSS information. The SSS processing module 316b may be substantially similar to SSS processing module 316a.

The matched filters 314a and 314b may comprise suitable logic, circuitry and/or code that are enabled to correlate an input signal with one or more reference signals, and generate a correlation signal at its output. The SSS decision module 318 may comprise suitable logic, circuitry, and/or code that is enabled to determine the SSS position based on a plurality of inputs from SSS processing modules, for example the SSS processing modules 316a and 316b.

In accordance with various embodiments of the invention, the primary synchronization signal (PSS) may be used to establish slot timing and/or to correct for frequency offset between the transmitter RF oscillator and the receiver RE oscillator. To establish slot timing, the position of the PSS may be determined, as illustrated in FIG. 2. In accordance with various embodiments of the invention, the PSS position in EUTRA LTE may be determined by correlating a received signal with each of the possible PSS sequences. As described with regard to FIG. 2, the PSS may be selected from a set of 3 sequences, in accordance with an embodiment of the invention.

FIG. 3 illustrates an exemplary correlation system for two receive antennas. For example, at a first antenna 302a, an RF signal may be received. The received RF signal may be communicated to the RF processing chain 304a, where it may be converted to a suitable baseband signal for further signal processing. The received RF signal may also be communicated to the SSS processing module 316a. The baseband signal may be correlated in the matched filter 314a, with each of the possible PSS sequences. Correlation sequences of the resulting correlation coefficients between the received baseband signal and each of the possible PSS reference sequences may be communicated to the magnitude module 306a. The magnitude module 306a may convert the correlation sequences from, for example, complex sequences into magnitude sequences. Similarly, the RF signal that may be received at a second antenna 302b may be converted to a baseband signal and correlated with possible PSS reference sequences. The outputs of the magnitude modules 306a and 306b may be combined by the adder 308.

The output of the adder 308 may be integrated, and/or filtered in the filter 310. A buffer in filter 310, for example, may comprise the possible timing hypotheses which may exist over a 5 ms half-frame interval, as illustrated in FIG. 2. For example, at an exemplary sampling rate of 1.92 MHz, 9600 possible timing hypotheses may result over a 5 ms interval for the possible location of a PSS slot. In general, the correlation sequence corresponding to the reference sequence that may have been used for the PSS at the transmitter, may exhibit low correlation except for one or several contiguous samples, whereas the correlation sequences from the non-used reference sequences may exhibit low correlation throughout. Thus, in the timing selection module 312, a likely PSS position over a half-frame may be estimated by looking for a peak in the generated correlation sequences input to the filter 310. The timing selection 312, in accordance with various embodiments of the invention, may not be limited to the described peak-searching algorithm, but may be using an arbitrary correlation sequence detection algorithm. The PSS timing selection obtained may also be used to establish initial frequency offset between a receiver local oscillator, and a transmitter local oscillator.

Figure 4:
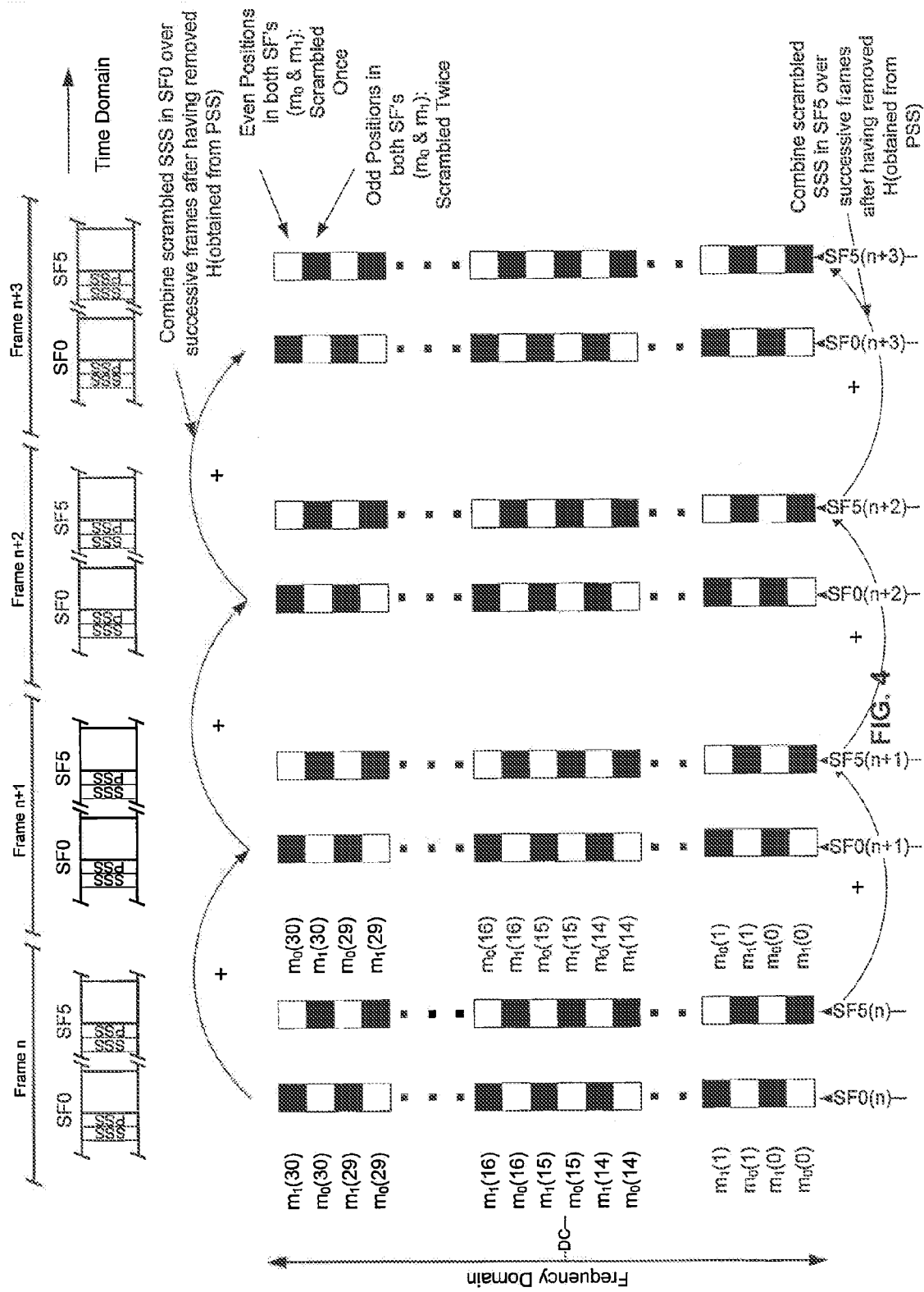
FIG. 4 is a diagram illustrating an exemplary secondary synchronization process, in accordance with an embodiment of the invention.

FIG. 4 is a diagram illustrating an exemplary secondary synchronization process, in accordance with an embodiment of the invention. Referring to FIG. 4, there is shown frame n, frame n+1, frame n+2, frame n+3, where the time domain is indicated with increasing time from left to right. For each frame, a sub-frame 0 (SF0), and an SF5 may be illustrated, also referred to as SF0(n) for sub-frame 0 of frame n. Each of the sub-frames SF0 and SF5 may comprise an SSS OFDM symbol and a PSS OFDM symbol, as described with regard to FIG. 2. There is further shown a frequency domain, as indicated by the frequency domain axis. There is also shown a DC marker on the frequency domain axis. There are further shown two interleaved SSS sequences $m_0 = [m_0(0), \ldots, m_0(i), \ldots m_0(30)]$ and $m_1 = [m_1(1), \ldots, m_1(i), \ldots m_1(30)]$, each may be of length 31 as described with regard to FIG. 2, in accordance with various embodiments of the invention. Each bit of the sequences $m_0$ and/or $m_1$ may be mapped to a sub-carrier, as indicated by its position along the frequency domain axis.

In accordance with various exemplary embodiments of the invention, once PSS synchronization and slot timing have been established and initial frequency offset compensation performed, frame timing synchronization may be obtained via the secondary synchronization sequences (SSS). The SSS may be signaled by the base station similarly to the PSS, as described with regard to FIG. 2. As illustrated in FIG. 2, the SSS may be located in the symbol immediately preceding the PSS, and thus the location of the SSS may be known if the length of the cyclic prefix (CP) separating the SSS and the PSS are known. In accordance with various embodiments of the invention, a EUTRA LTE system may employ one of a set of two different CP lengths, for example 9 or 32 samples. At initial receiver startup, the CP length may not be known at the receiver, and may be estimated by testing for each possible CP length. Correct detection of the SSS may thus also provide correct CP length detection.

The SSS information may be signaled in two successive symbols containing SSS information, in SF0 and in SF5, as illustrated with respect to FIG. 2 and FIG. 4. For example, the two length 31 sequences $m_0$ and $m_1$ may be interleaved and may be mapped to the frequency domain, as illustrated in FIG. 4. The interleaving may alternate between successive sub-frames, as illustrated for example between SF0(n) and SF5(n). Thus, SF0(n) may be similarly interleaved to SF0(n+1), SF0(n+2) and so on. This may be indicated by the arched arrows between successive sub-frame 0 corresponding to different frames. Similarly, arched arrows may indicate that SF5(n) may be similar to SF5(n+1), SF5(n+2) and so on. Since these sub-frames contain similarly interleaved sequences $m_0$ and $m_1$, similarly interleaved successive frames may be processed together to obtain time diversity. Similarly, corresponding received sub-frames from different receive antennas may be processed together to provide spatial diversity.

Before the sequences $m_0$ and $m_1$ may be mapped to the frequency domain, the elements of the interleaved SSS sequences may be scrambled. In accordance with various embodiments of the invention, the elements appearing in even SSS sub-carrier positions may be scrambled once, while the elements in odd SSS sub-carrier positions may be scrambled twice. In some instances, the second scrambling of the information appearing in the odd carrier positions may depend on information comprised in the even carrier positions. Thus, depending on the order in which the sequences $m_0$ and $m_1$ may be interleaved, the elements may be scrambled once or twice. The same underlying information comprised in the sequences $m_0$ and $m_1$ may thus be encoded once or twice, and may be alternately transmitted via successive sub-frames. Hence, the sub-frames 0 of successive frames may be combined, and the sub-frames 5 of successive frames may be combined. Since the scrambling and interleaving may be known, the SSS decoding may be based on detecting the transmitted information from once and twice scrambled SSS bits and comparing the information detected in SF0 and SF5. Because both sets may comprise the same information, a correct detection, with a correctly assumed CP length, may result in consistent recovery of similar information. Thus, the information from odd and even carriers may be processed separately, while taking the dependence of odd position scrambling on even position information into account. To enable coherent combining over successive frames of SSS information, the PSS sequence may be used to obtain a channel estimate for the SSS information.

Figure 5:
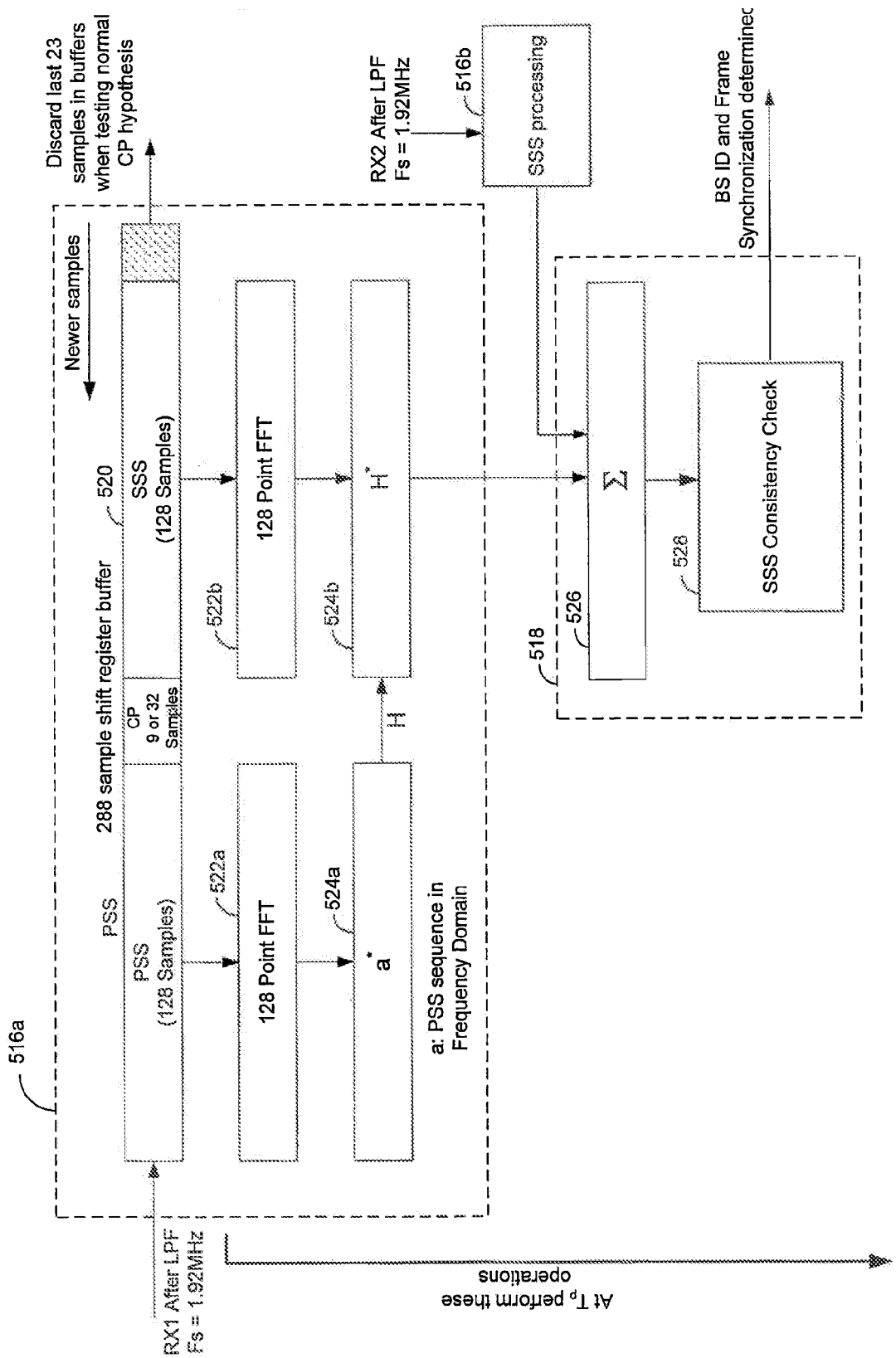
FIG. 5 is a diagram illustrating an exemplary secondary synchronization sequence detection system, in accordance with an embodiment of the invention.

FIG. 5 is a diagram illustrating an exemplary secondary synchronization sequence detection system, in accordance with an embodiment of the invention. Referring to FIG. 5, there is shown an SSS decision module 518, and SSS processing modules 516a and 516b. The SSS processing module 516a may comprise a shift-register 520, Fast Fourier Transform (FFT) modules 522a and 522b, and filters 524a and 524b. The SSS decision module 518 may comprise an adder 526, and a SSS consistency module 528. There is also shown an input signal to the shift-register 520 from a first receiver antenna RX1, and a second input to the SSS processing module 516b from a second receiver antenna RX2. The input signals RX1 and RX2 may be at an exemplary sampling rate of 1.92 MHz, in accordance with an embodiment of the invention. There is also shown an output signal from the SSS consistency module 528, which may comprise a decoded base station identifier of transmitting base station, and frame timing synchronization information.

The SSS processing modules 516a and 516b may be substantially similar to the SSS processing modules 316a and 316b, respectively. The SSS processing module 516a may be substantially similar to the SSS processing module 516b. The SSS decision module 518 may be substantially similar to the SSS decision module 318. The shift-register 520 may comprise suitable logic, circuitry and/or code that may be enabled to store, output and/or process a stream of input bits. The FFT modules 522a and 522b may comprise suitable logic, circuitry and/or code that may be enabled to compute a Fast Fourier Transform (FFT) of one or more input signals. The filters 524a and 524b may comprise suitable logic, circuitry and/or code that may be enabled to process an input signal by an arbitrary function. In some instances, the arbitrary function may be discrete. The adder 526 may comprise suitable logic, circuitry and/or code that may be enabled to generate an output signal that may be proportional to a weighted sum of a plurality of input signals. The SSS consistency module 528 may comprise suitable logic, circuitry and/or code that may be enabled to process one or more combined input signals from the SSS processing modules 316a and 316b, and may verify information consistency to determine a base station identifier, the ordering of the detected SSS information, $m_0$ and $m_1$, and indicating frame timing synchronization.

A received baseband signal RX1 from a first receiver antenna may be communicatively coupled to the shift-register 520 in the SSS processing module 516a. As illustrated in FIG. 5, the right-most bits in the shift-register 520 may be the first-received bits. In accordance with various embodiments of the invention, the shift-register 520 may comprise, for example, 288 samples. The shift-register 520 may comprise sufficient memory to permit the storage of the PSS, the SSS, and the longest possible CP, as illustrated. Since the position and length of the PSS may be known after PSS detection, the remainder of the information may comprise the SSS and the CP in the shift-register when the last sample of the PSS may be entering the shift-register 520 because the SSS OFDM symbol may immediately precede the PSS, as illustrated in FIG. 2, for example. However, the length of the CP may not be known. Thus, in accordance with an embodiment of the invention, the left-most samples in the shift-register 520 may be known to comprise the PSS sequence. The PSS sequence may be preceded by a CP of unknown length. The CP may be of length 9 or 32 samples at an exemplary sampling rate of 1.92 MHz, for example. The CP in turn may be preceded by the SSS. The SSS processing module 516 may assume a CP length of either 9 or 32 samples, and assume a location of the SSS accordingly. If a CP length of 9 is assumed, the right-most 23 (first-received) samples in the shift-register 520 may be discarded and not be processed, as illustrated in FIG. 5. If the assumed CP length is correct, the processing of the assumed SSS may consistently lead to the detection of similar information over a plurality of frames and/or antennas, as described for FIG. 4. On the other hand, if the assumed CP length is incorrect, the processed data from the shift-register 520 may not correspond to the SSS, and further processing in the SSS processing module 516a, and the SSS decision module 520 may produce inconsistent results.

The PSS samples from shift-register 520 may be processed in the FFT module 522a. Since the PSS sequence position and identity may be known after PSS synchronization, the PSS sequence in the frequency domain, a, may be used to estimate a channel transfer function of the wireless channel, H. The wireless channel transfer function H may be a complex matrix function, in some instances. With regard to the SSS, the assumed SSS information (based on an assumed CP length) may be processed in the FFT module 522b. The wireless channel estimate H obtained from PSS processing in the filter 524a, may be used to detect the information comprised in the assumed secondary synchronization sequence in the filter 524b. The detected information from filter 524b may be forwarded to the SSS decision module 518, where it may be combined in the adder 526, for example, with similar information obtained from the SSS processing module 516b, from a second receiver antenna. The SSS consistency module 528 may test for information consistency in the information detected in sub-frames 0 and 5, as described in FIG. 4, and determine the base station ID and/or the frame timing, based on its input data from the adder 526.

Figure 6:
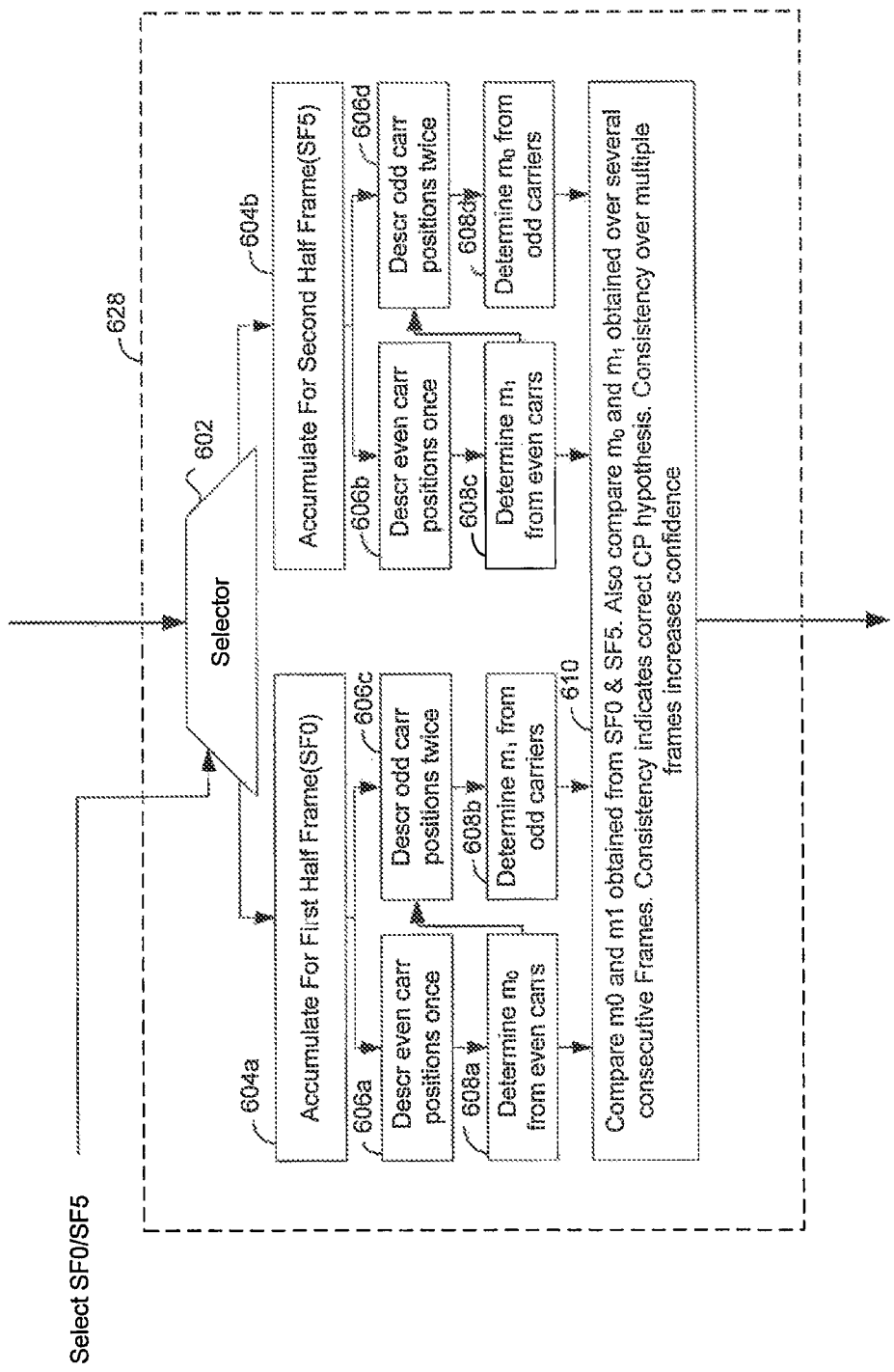
FIG. 6 is a flow chart illustrating an exemplary SSS consistency protocol, in accordance with various embodiments of the invention.

FIG. 6 is a flow chart illustrating an exemplary SSS consistency protocol, in accordance with various embodiments of the invention. Referring to FIG. 6, there is shown an SSS consistency protocol 628, which describes functionality substantially similar to the SSS consistency module 528.

SSS Information received via the adder 526, for example, may comprise information corresponding to sub-frame (SF) 0 and/or SF5, as described with regard to FIG. 4 and FIG. 5. Thus, the selector 602 may determine that the SSS information input may be processed as SF0 and/or SF5 information. The selector 602 may be controlled via a select signal, for example. If the information is processed as corresponding to SF0, the left branch comprising step 604a may be selected. If the information is processed as corresponding to SF5, the right branch comprising step 604b may be selected.

In step 604a, SSS information processed as SF0 information may be accumulated initially. In step 606a, information associated with even sub-carrier positions may be descrambled, in accordance with various embodiments of the invention and as described with regard to FIG. 4. In step 608a, the descrambled information may be utilized to determine $m_0$ from the descrambled information of the even sub-carriers. In step 606c, information associated with odd sub-carrier positions may be descrambled twice, the second descrambling based on the value of $m_0$ detected during step 608a, in accordance with various embodiments of the invention and as described with regard to FIG. 4. In step 608b, the twice descrambled information, may be utilized to determine $m_1$ from the descrambled information of the odd sub-carriers.

Similarly, in step 604b, the SSS information that may be processed as SF5 information may be accumulated initially. In step 606b, information associated with even sub-carrier positions may be descrambled once, in accordance with various embodiments of the invention and as described with regard to FIG. 4. In step 608c, the descrambled information may be utilized to determine $m_1$ from the descrambled information of the even sub-carriers. In step 606d, information associated with odd sub-carrier positions may be descrambled twice, the second descrambling based on the value of $m_1$ detected during step 608c in accordance with various embodiments of the invention and as described with regard to FIG. 4. In step 608d, the twice descrambled information may be utilized to determine $m_0$ from the descrambled information of the odd sub-carriers.

In step 610, the determined $m_0$ from steps 608a and 608d, and $m_1$ from steps 608b, and 608c, may be compared, and checked for consistency. Moreover, the consistency checks in step 610 may be performed over multiple frames, as described with regard to FIG. 4. If information is found consistent, an assumed CP length hypothesis may be correct. If the CP length is determined correctly, the system may achieve SSS timing synchronization because the location of the PSS OFDM symbol and the CP length determine the location of the SSS OFDM symbol. Moreover, consistent information recovery may imply that the SF0 and the SF5 have been identified, and thus frame timing may have been achieved. By decoding the information carried by the SSS information, the receiver may also, in combination with the detected PSS identity determined as part of the slot synchronization process, decode the base station identifier of the transmitting base station.

In accordance with an embodiment of the invention, a method and system for frame timing acquisition in EUTRA may comprise determining a received secondary synchronization sequence (SSS) based on a selected cyclic prefix length, and synchronization of a primary synchronization sequence (PSS). A first portion of information associated with the received SSS, for example half-frame 206a, may be processed separately from a second portion of information associated with the received SSS, for example half-frame 206b. A frame timing and/or base station identifier may be determined, by comparing the processed first portion of information with the processed second portion of information.

The cyclic prefix length may be selected from a finite set of possible cyclic prefix lengths. The cyclic prefix length may be selected from a finite set of possible cyclic prefix lengths comprising 9 samples and 32 samples, for example. The primary synchronization sequence synchronization may be determined via correlation, for example matched filters 314a and 314b. The primary synchronization sequence correlation may determine slot timing and a channel estimate may be obtained via PSS processing. At least a part of the first portion of SSS information is associated with odd sub-carrier positions, and may be processed separately from at least a part of the first portion of SSS information that is associated with even sub-carrier positions. At least a part of the second portion of SSS information is associated with odd sub-carrier positions, and may be processed separately from at least a part of the second portion of SSS information that is associated with even sub-carrier positions. Odd sub-carrier positions and even sub-carrier positions associated with the secondary synchronization sequence may be scrambled once and twice respectively, or vice versa, as illustrated in steps 606a, 606b, 606c, and 606d, for example. The frame timing may be determined by determining whether the selected cyclic prefix length results in consistently decoded information, wherein the consistency of the decoded information may be determined by comparing the processed first portion of information with the processed second portion of information, as described for step 610. The first portion of information may be a first half-frame, and the second portion of information may be a second half-frame.

Another embodiment of the invention may provide a machine-readable and/or computer-readable storage and/or medium, having stored thereon, a machine code and/or a computer program having at least one code section executable by a machine and/or a computer, thereby causing the machine and/or computer to perform the steps as described herein for frame timing acquisition in EUTRA.

Accordingly, the present invention may be realized in hardware, software, or a combination of hardware and software.

The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An apparatus, comprising:
a processor configured to process a first portion of information and a second portion of information, the first and second portions of information containing a first and a second secondary synchronization signal (SSS), respectively, based on subcarrier positions of the first and second SSSs, wherein the first and second portions of information are included in a first and a second sub-frame, respectively, from among a plurality of first and second sub-frames;
wherein the processor is further configured to combine the first and second portions of information from each of the plurality of first and second sub-frames to provide a first and a second set of detected information corresponding to a selected cyclic prefix (CP) length; and
a decision module configured to determine a network statistic based on a comparison between the first and second sets of detected information.

2. The apparatus of claim 1, wherein the first and second SSS are the same SSS, and wherein the processor further comprises:
a shift register buffer configured to store the SSS and a CP according to the selected CP length.

3. The apparatus of claim 2, wherein the processor is further configured to select the SSS from the shift register buffer based on the selected CP length.

4. The apparatus of claim 3, wherein the selected CP length is selected from a set of CP lengths.

5. The apparatus of claim 4, wherein the set of CP lengths comprises:
9 samples; and
32 samples.

6. The apparatus of claim 1, wherein the first and second SSS are the same SSS, wherein the processor is further configured to process a primary synchronization sequence (PSS) to provide a channel estimate, and wherein the first and second sets of detected information are based on the channel estimate and the SSS.

7. The apparatus of claim 1, wherein the first and second SSS are the same SSS, and wherein the network statistic comprises:
   a frame timing;
   a base station identifier;
   SSS information; or
   the SSS.

8. The apparatus of claim 1, wherein the first SSS is interleaved with the second SSS such that the first SSS occupies even subcarrier positions within the first sub-frame and odd subcarrier positions within the second sub-frame, and wherein the second SSS occupies even subcarrier positions within the second sub-frame and odd subcarrier positions within the first sub-frame.

9. The apparatus of claim 8, wherein the processor is further configured to scramble the first and second SSSs that occupy even subcarrier positions once, and to scramble the first and second SSSs that occupy odd subcarrier positions twice.

10. The apparatus of claim 1, wherein the plurality of first and second sub-frames constitute a plurality of consecutive data frames.

11. In a wireless device, a method for processing communication signals, comprising:
   receiving a first portion of information and a second portion of information from among a plurality of information, the first and second portions of information containing a first and a second secondary synchronization signal (SSS), respectively, and being included in a first and a second sub-frame, respectively, from among a plurality of first and second sub-frames;
   selecting a cyclic prefix (CP) length from among a set of CP lengths;
   combining the first and the second portions of information from the plurality of first and second sub-frames to provide a first and a second set of detected information corresponding to the CP length;
   extracting the first and second SSS from the first and second sets of detected information, respectively, based on the CP length; and
   comparing the first SSS and the second SSS to determine a consistency between them and to verify they have been properly decoded.

12. The method of claim 11, wherein the plurality of first and second sub-frames constitute a plurality of consecutive data frames.

13. The method of claim 12, wherein the plurality of first and second sub-frames include information associated with even and odd sub-carrier positions, the method further comprising:
   processing separately a part of the plurality of first sub-frames associated with odd sub-carrier positions from a part of the plurality of first sub-frames associated with even sub-carrier positions.

14. The method of claim 12, wherein the plurality of first and second sub-frames include information associated with even and odd sub-carrier positions, the method further comprising:
   processing separately a part of the plurality of second sub-frames associated with odd sub-carrier positions from a part of the second sub-frames associated with even sub-carrier positions.

15. The method of claim 11, wherein the first SSS is interleaved with the second SSS such that the first SSS occupies even subcarrier positions within the first sub-frame and odd subcarrier positions within the second sub-frame, and wherein the second SSS occupies even subcarrier positions within the second sub-frame and odd subcarrier positions within the first sub-frame.

16. The method of claim 15, further comprising:
   scrambling the first and second SSSs which occupy even subcarrier positions once; and
   scrambling the first and second SSSs which occupy odd subcarrier positions twice.

17. In a wireless device, a method for processing communication signals, comprising:
   selecting a cyclic prefix (CP) length from among a set of CP lengths;
   processing separately a first portion of information associated with a received first secondary synchronization sequence (SSS) and a second portion of information associated with a received second SSS based on corresponding sub-carrier positions of the first and second SSSs, the first and second portions of the information being included in a first and a second sub-frame, respectively, from among a plurality of first and second sub-frames;
   combining the first and second portions of information from the plurality of first and second sub-frames to provide a first set of processed information and a second set of processed information, respectively;
   comparing the first set of processed information and the second set of processed information to evaluate a consistency of decoded information obtained from the first and second sets of processed information based on the selected CP length; and
   determining a wireless network statistic based on the decoded information.

18. The method of claim 17, wherein the selecting comprises:
   selecting a CP length of 9 samples or 32 samples.

19. The method of claim 17, further comprising:
   determining a synchronization of a primary synchronization sequence (PSS) included in the plurality of first and second sub-frames via a correlation sequence detection algorithm.

20. The method of claim 17, further comprising:
   determining a synchronization of a primary synchronization sequence (PSS) included in the plurality of first and second sub-frames by determining a slot timing and a channel estimate via PSS processing.

21. The method of claim 17, wherein the processing further comprises:
   processing separately a part of the first portion of the information associated with an odd sub-carrier position from a part of the first portion of the information that is associated with an even sub-carrier position.

22. The method of claim 17, wherein the processing further comprises:
   processing separately a part of the second portion of the information associated with an odd sub-carrier position from a part the second portion of the information that is associated with an even sub-carrier position.

23. The method of claim 17, wherein the first and second SSS are the same SSS, and wherein the determining the wireless network statistic comprises:
   determining a frame timing, a base station identifier, SSS information, or the SSS as the wireless network statistic.

24. The method of claim 17, wherein the first SSS is interleaved with the second SSS such that the first SSS occupies even subcarrier positions within the first sub-frame and odd subcarrier positions within the second sub-frame, and wherein the second SSS occupies even subcarrier positions within the second sub-frame and odd subcarrier positions within the first sub-frame.

25. The method of claim 24, further comprising:
scrambling the first and second SSSs that occupy even subcarrier positions once; and
scrambling the first and second SSSs that occupy odd subcarrier positions twice.

26. The method of claim 17, wherein the plurality of first and second sub-frames constitute a plurality of consecutive data frames.

* * * * *